UNITED STATES PATENT OFFICE.

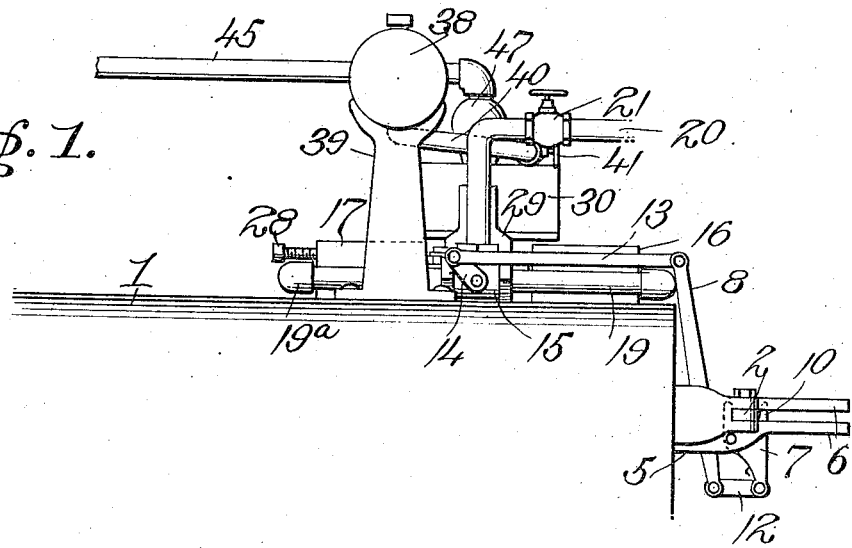
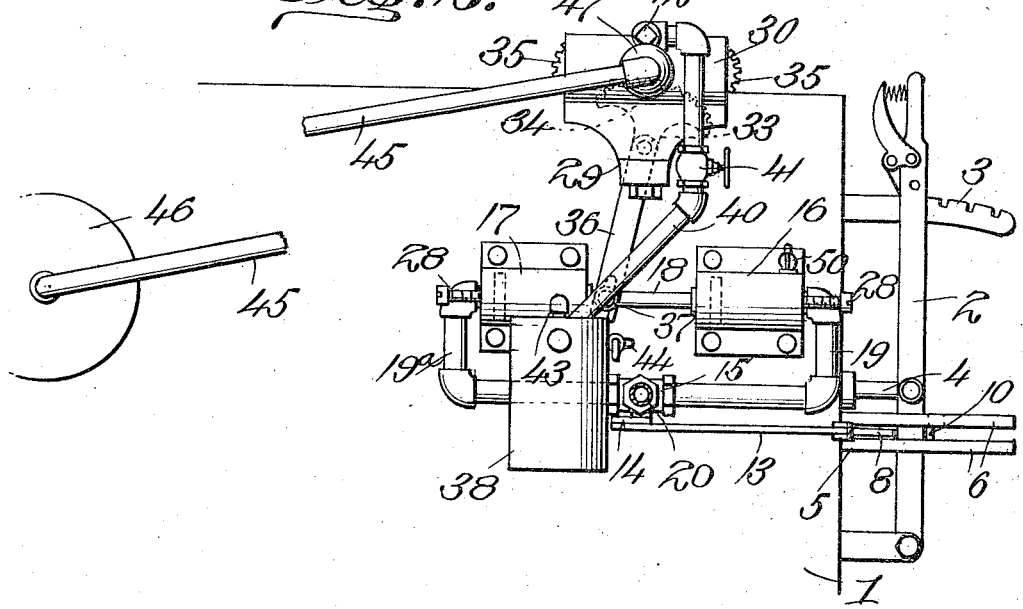

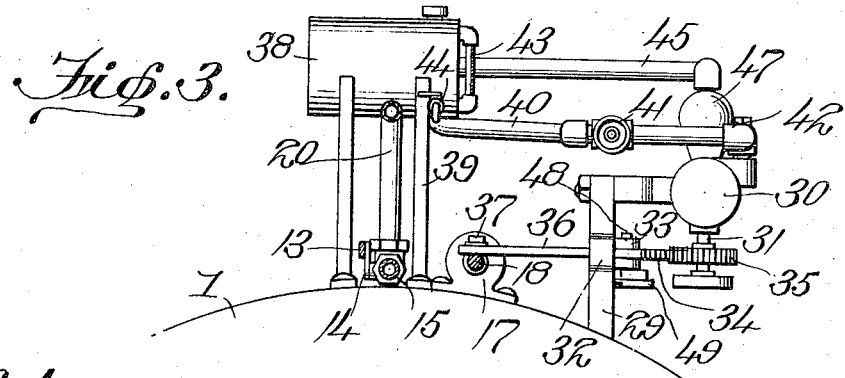
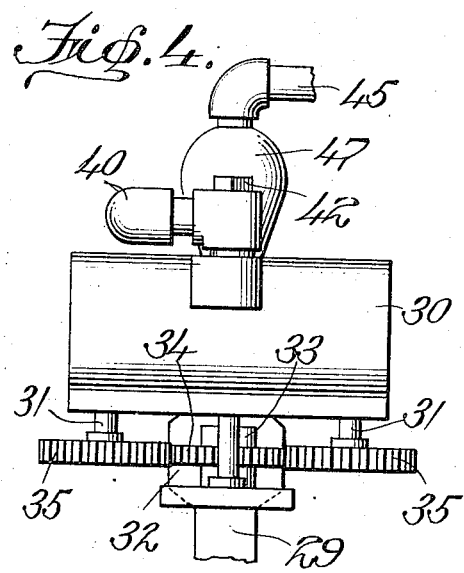
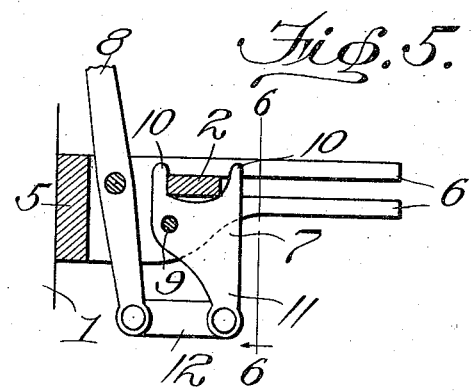
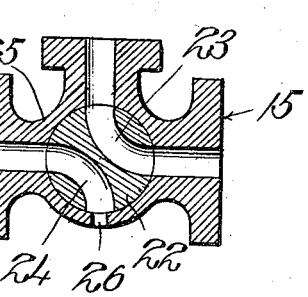
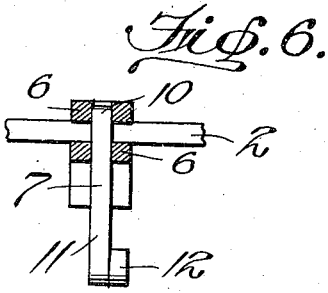

WILLIAM J. BYRON, OF EVELETH, MINNESOTA.

LUBRICATING SYSTEM.

1,244,173. Specification of Letters Patent. Patented Oct. 23, 1917.

Application filed January 17, 1917. Serial No. 142,875.

*To all whom it may concern:*

Be it known that I, WILLIAM J. BYRON, a citizen of the United States, residing at Eveleth, in the county of St. Louis, State of Minnesota, have invented certain new and useful Improvements in Lubricating Systems; and I do hereby declare the following to be a full, clear, and exact description of the invention, such as will enable others skilled in the art to which it appertains to make and use the same.

This invention relates to lubricating systems, and more particularly to lubricating systems for locomotives.

The primary object of the invention is to provide a lubricating system for locomotives in which the lubricating valves are shut off simultaneously with the closing of the throttle valve.

A further object of the invention is to provide a system as above set forth in which the lubricating valves are air actuated. In this connection it is also a purpose to provide an air actuating system for lubricating valves which is set into automatic operation by means of the opening and closing of the throttle valve.

A serious problem in railway locomotive operation is the economical use of lubricating oil, and a serious factor in the question of lubrication arises from the fact that the lubricating system is allowed to run while the steam is cut off, or while the locomotive is a standstill. In the usual systems, the steam is admitted to the lubricator distributing valves from the steam dome, and when the locomotive is stopped, the steam pressure continues to distribute the oil to the various parts of the locomotive. To avoid this leakage is one of the purposes of this invention.

A further object of the invention consists in providing a lubricating system as above defined in which the extent to which the lubricating valves are closed may be regulated by suitable adjusting devices, these devices being located in the air system for operating the lubricating valves.

In connection with the economical purpose of this invention, it is to be noted that in those systems which are known to me, in each instance that oil is transferred from one receptacle to another, as from the barrel to the oil can and from the latter to the tallow pot and thence to the lubricator, a certain amount of oil is wasted. By transferring the oil from the barrel or other supply source to the oil supply tank of my invention, this multiple transfer is avoided with a consequent aggregate saving of the oil, since, in order to fill the lubricator from the oil tank in the system, it is merely necessary to open the conduit connecting the tank with the lubricator. This also avoids the hitherto necessary opening of the lubricator for the purpose of filling it, an operation which carried the danger of hot oil flying and burning the engineer or other operative. The oil supply tank or reservoir is of four or five gallons capacity and need only be filled at division points, and is furthermore located above the system, as behind the steam gages, so that it feeds gravitally to the lubricator.

With the above objects in view and such others as may hereinafter appear, relating to the details my invention will now be fully set forth and described, reference being had to the accompanying drawings:—

In the drawings:—

Figure 1 is a side elevation of a locomotive boiler head having my invention applied thereto, Fig. 2 is a plan view with parts broken away for the sake of clearness, Fig. 3 is a section on line 3—3 of Fig. 1, Fig. 4 is a partial side elevation taken opposite to Fig. 1 showing the lubricator, Fig. 5 is an enlarged view of the throttle lever and lubricator actuating devices, Fig. 6 is a section on line 6—6 of Fig. 5, Fig. 7 is a section through the air distributing valve of the system, and Fig. 8 is a view of the distributing valve in another position.

Referring more particularly to the drawings, 1 indicates the boiler head within the locomotive cab and having the usual throttle lever 2 which operates over a quadrant 3 and controls the throttle stem 4. Also mounted upon the boiler head, preferably to the right of the throttle stem 4 is a guide bracket 5 which, as best seen in Figs. 5 and 6 consists of a base plate having four quadrangularly disposed arms 6 which provide a horizontal slide-way through which the throttle lever 2 may operate, and a vertical guide-way in which is mounted a trip 7 and a rock lever 8. The trip 7 consists of a body or casting having a bearing 9 between the lower pair of arms 6 and having its upper portion provided with a pair of fingers or projections 10 which embrace the front and rear edges of the throttle lever, the trip 7 being thus rocked forwardly or backwardly with each corresponding movement of the lever 2. The rock lever 8 is also pivoted between the lower pair of arms 6, and has its lower end extended downwardly substantially coextensive with the lower end 11 of the trip 1 and is thereto pivotally connected by means of a link 12, so that each movement of the trip 7 is communicated to the rock lever 8. The upper end of the rock lever 8 extends above the boiler head, and is pivotally connected to a lever 13 whose opposite end is connected to a valve arm 14 mounted on the stem of a distributing valve 15.

The distributing valve 15 forms a part of an air system which includes the air cylinders 16 and 17, a common piston rod 18 being operative between the cylinders 16 and 17 and carrying a piston head upon each end operative in the corresponding cylinders 16 and 17. Air is admitted to the cylinders 16 and 17 in accordance with the positions of the distributing valve 15, air pipes 19 and 19ª extending in opposite directions from the valve 15 and being suitably connected to the heads of the cylinders 16 and 17 respectively, and receiving air through the distributing valve from a main air pipe 20 which is an extension from the air system of the locomotive. A valve 21 in the pipe 20 permits the regulation of the air supply to the distributing valve. As shown in Fig. 7, the valve plug 22 of the valve 15 is provided with two right-angularly disposed ports 23 and 24, and the casing 25 is that of a four-way valve. When the valve 15 stands in the position shown in Fig. 7, the cylinder 16 stands in communication with the air supply from the pipe 20 and the cylinder 17 stands in communication with the atmosphere through the port 26. The piston in the cylinder 16 then, obviously, is driven to the left in Fig. 2 carrying therewith the piston in the cylinder 17 through the connecting rod 18. When the valve stands in the position of Fig. 8, the above operation is reversed and the pistons are returned to their normal positions. It will be noted that the port 26 in the casing 25 by means of which the cylinders are ordinarily connected with the atmosphere, is of smaller diameter than the other ports so that the escape of air from the idle cylinder is not too rapid and thereby acts as a cushion to the piston of the operative cylinder, and the other parts of the mechanism with which the piston rod 18 is associated.

Entered into the rear head of each one of the cylinders 16 and 17 is a threaded stud 28 which extends into the cylinder, so that it may be contacted by the piston therein. By varying the distance of this extension or projection into the cylinders, the movement of the pistons may be limited so as to adjust accurately the amount of throw of the lubricator actuating mechanism hereinafter described and thereby limiting the extent to which the valves are closed.

Suitably supported upon the boiler is a frame 29 which carries the usual lubricator 30. The latter may be of the usual type employed upon locomotives, and has the stems 31 which project from the lubricator valves, said stems projecting below the lubricator body in substantially parallel relation. The frame 29 supports the lubricator 30 from its upper end, and at an intermediate portion is formed into a yoke 32 and bearings 33. Extending through the yoke 32 and having a vertical pivot in the bearings 33 is a gear segment 34 which meshes with each one of a pair of pinions 35 mounted on the lower ends of the stem 31 so that rotation of the segment 34, commonly rotates the pinions 35 to open and close the lubricating valves. The rear portion of the segment 34 is continued in a crank arm 36 whose rear end is slotted and yoked over a wrist pin 37 which is fixed upon the middle portion of the piston rod 18, so that reciprocation of the latter through the crank arm 36 will actuate the gear segment 34. Oil is supplied to the lubricator from a supply tank 38 mounted upon a standard 39 at such a suitable height above the boiler that the oil will flow gravitally to the lubricator through a supply pipe 40 connecting the tank and the lubricator. A valve 41 is provided to regulate the flow of the oil to the lubricator and the usual plug 42 is removable from the coupling between the pipe 40 and the lubricator in order to permit the initial filling of the latter, or any emergency manual filling which may be necessary. A sight gage 43 provides a means for determining the quantity of oil in reserve, and a tap 44 permits oil to be drawn from the tank 38 for the purpose of filling the oil cans for other necessary purposes. The usual steam pipe 45 connects the steam dome 46 with the lubricator head 47 to furnish the necessary steam pressure to the latter. The bearing pin 48 upon which the segment 34 rocks is held in position by means of a latch plate 49, and by releasing the pin 48 from the latch plate and removing it from the bearings 33, the segment may be shoved out of contact with the pinions 35 so that the lubricating valves may be actuated by hand as is customary at the present time.

It sometimes becomes necessary to fill the lubricator while the locomotive is in motion, that is, when the engine is in operation. In order to do this, the valve 21 is closed to cut off the air from the cylinders 16 and 17, and the bleeder valve 50 in the cylinder 16 is opened. The crank arm 36 may thus be swung over, carrying the piston rods 18 therewith, so that the lubricating valves are closed, when oil may be supplied to the lubricator. The crank arm may then be thrown to open position, the bleeder valve 50 closed, and the valve 21 opened. Thus, after the lubricator has been filled, the apparatus is ready to work automatically.

In ordinary locomotive constructions, the throttle lever, after it has fully closed the throttle valve, is permitted a certain amount of slack or idle motion, usually about two or three inches. In connecting the throttle lever 2 with the trip 7 of the present invention, this slack motion is utilized in operating the trip. That is, the trip is swung to operate the apparatus, just at the instant before the throttle valve is opened, and vice versa, the throttle valve is closed at just the instant before the lubricating apparatus is cut off. When the throttle lever 2 is thrown to open position, the trip 7 is rocked outwardly and through the trip, the rock lever 8, the link 13, and the valve arm 14, the distributing valve is set into the position of Fig. 8, so that air is allowed to pass through the head of the cylinder 17. Through the piston rod 18, the crank arm 36 is thrown to the right, thereby operating the pinions 35 through the action of the segment 34 to open the lubricating valves. Oil is then constantly supplied to the cylinders of the locomotive from the supply tank 38, and is distributed in the usual manner. When the throttle lever is thrown into closed position, the action of the trip is reversed and the distributing valve set into position of Fig. 7 whereby air is introduced into the cylinder 16 to throw the piston rod 18 to the left in Fig. 2, thereby reversing the action of the segment 34 and reversing the rotation of the pinions 35 to close the lubricating valves.

From the foregoing it is evident that I have provided a very simple and effective apparatus for automatically actuating the lubricating valves of a locomotive and for effecting this operation simultaneously with the operation of the throttle lever. By adjusting the amount of throw of the piston rod 18 by positioning the studs 28 in the cylinders 16 and 17, the lubricating valves can be prevented from wholly closing or wholly opening to regulate the flow therethrough. In this manner, a necessary adjustment for lubricators when the locomotive is coasting is provided for. By the use of air pressure from the air system for actuating the device, a positive and instantaneous actuation of the lubricating valves is assured, and there is no danger of the valves sticking to prevent the flow of oil from the lubricator. Furthermore, the mechanism of my apparatus may be readily applied to any of the forms of lubricators now in common use upon locomotives, the devices being merely interposed between the lubricator and the throttle valve in such a manner as to obviate the need of changing any of the regular parts of the locomotive.

What I claim as my invention is:—

1. A lubricating system for locomotives, comprising in combination with a lubricator and the throttle lever, an oil supply tank communicating with said lubricator, a lubricator valve actuating mechanism a trip device connected to the throttle lever, an air controlled means for operating said valves, and a distributing valve in said controlled means and actuated by said trip device to open and close the lubricator valves simultaneously with the opening and closing of the throttle valve.

2. A lubricating system for locomotives, comprising in combination with a lubricator and the throttle lever, an oil supply tank communicating with said lubricator, a lubricator valve actuating mechanism and air controlled devices actuated by the throttle lever to operate the valve actuating devices simultaneously with the throttle valve.

3. A lubricating system for locomotives, comprising in combination with a lubricator and the throttle lever, an oil supply tank communicating with said lubricator, a lubricator valve actuating mechanism oppositely disposed air cylinders having a common piston rod therebetween coupled to said valve actuating mechanism, an air distributing valve connected to said cylinders to alternately supply air thereto, and a trip device connected to the throttle lever, whereby, when the throttle valve is opened, air is admitted to one cylinder to actuate said piston rod and said valve actuating mechanism to open the lubricating valves.

In testimony whereof, I affix my signature, in the presence of two witnesses.

WILLIAM J. BYRON.

Witnesses:
L. E. JOHNSON,
ORTON F. HOEL.

Copies of this patent may be obtained for five cents each, by addressing the "Commissioner of Patents, Washington, D. C."